July 23, 1940.   A. JOOST   2,208,903
PRUNNING SHEARS
Filed Feb. 24, 1939
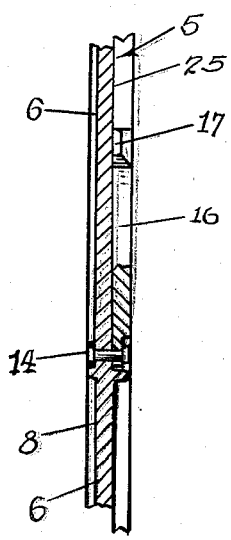
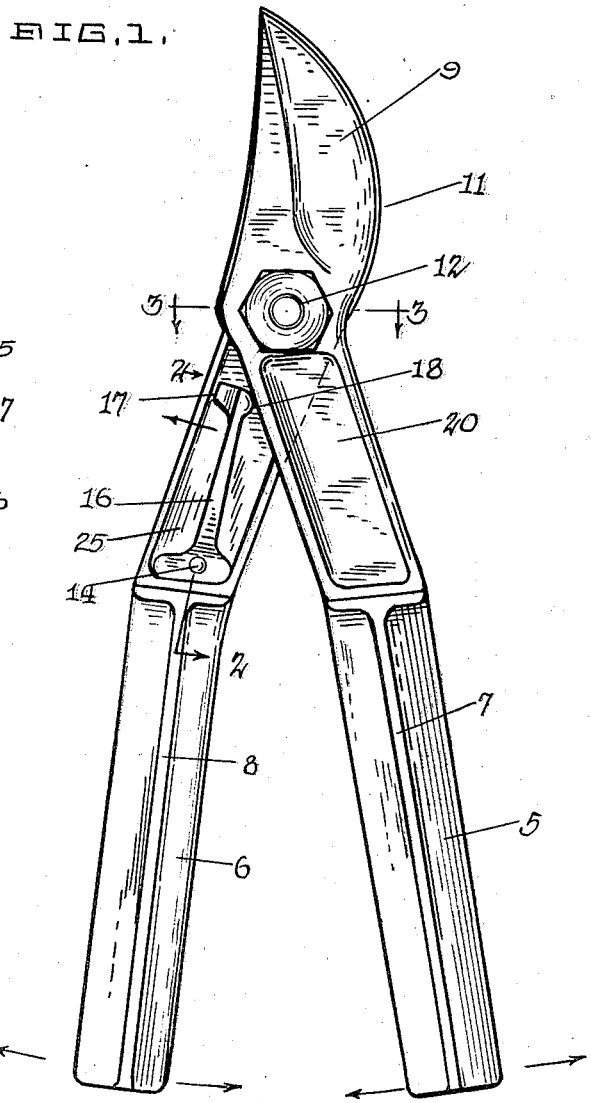
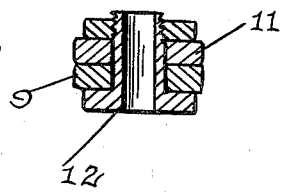
INVENTOR:
AUGUST JOOST.
BY
ATTORNEYS.

Patented July 23, 1940

2,208,903

UNITED STATES PATENT OFFICE 2,208,903

PRUNING SHEARS

August Joost, Berkeley, Calif.

Application February 24, 1939, Serial No. 258,300

2 Claims. (Cl. 30—271)

This invention relates to improvements in pruning shears and has particular reference to that type of pruning shears which include shear blades attached to extended arms, whereby difficult places may be easily reached with said shears.

A further object of the invention is to provide means for securely attaching the shears to the handles to prevent relative movement therebetween.

A further object is to provide braking means mounted on one handle of the device, whereby the cutting action will be cushioned when said device is in operation.

A further object is to produce a device of this character wherein the cutting edges of the blades of the shears are flat and, therefore, can be readily ground.

Other objects and advantages will be apparent during the course of the following description.

In the accompanying drawing forming a part of this specification and in which like numerals are employed to designate like parts throughout the same, Fig. 1 is a side elevation of the device with the elongated handles removed;

Fig. 2 is a cross sectional view taken on the line 2—2 of Fig. 1; and

Fig. 3 is a cross sectional view taken on the line 3—3 of Fig. 1.

The ordinary pruning shears consist of a pair of blades pivoted together and provided with extended handles, usually constructed of wood, which may be of any suitable length. These handles often break off due to strains thereon and the loosening action incident to the cutting of tree limbs and the like.

I have, therefore, provided a stop which will cushion the final movement of the cut so that the strain on the handles will be greatly relieved in that a sudden blow will not be encountered when the cut is completed.

In the accompanying drawing wherein for the purpose of illustration is shown a preferred embodiment of my invention, the numerals 5 and 6 designate extensions to which handles may be fitted, and each extension is provided with longitudinal webs, as shown at 7 and 8 respectively. These extensions and their webs are secured to the handles in any convenient manner. Due to the construction of the extensions, movement of the handles relative to each other is limited, and the shear blades are also limited in their relative movement.

Formed integral with each extension are shear blades 9 and 11, pivoted together as at 12. These blades are flat ground on their contacting surfaces, as shown at 13, so as to permit flat grinding for future sharpening. Riveted as at 14 to the shank portion of the blade 11 is a spring member 16 having a stop 17 and a nose 18.

The result of this construction is that when the shears are in use and the end of the cut is reached, the shank 20 of the blade 9 will contact the nose 18, flexing the spring member 16, which spring member is mounted upon the shank 25 of the blade 11, until the stop 17 contacts the raised edge of the shank 25. As this spring member 16 is relatively stiff, it will be apparent that the flexing thereof will serve to resist rotation of the blade 9 with relation to the blade 11 and, therefore, will slow up the movement of the handles toward each other, thus eliminating the usual shock which serves to break off the handles and, at the same time, easing the strain upon the operator.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. Pruning shears comprising shearing blades pivoted to each other having shank portions formed with integral laterally extending webs on their inner faces, a resilient shock absorbing element secured to one of said shanks within the space defined by the lateral webs, and having means for engaging the web for limiting the movement thereof on the shaft, and a nose adapted to be engaged by the web of the other shank.

2. Pruning shears comprising blades pivoted to each other and provided with shank portions, each shank portion having lateral extending webs carried by its inner face, a resilient member secured at one end only to one of said shanks within the space defined by the lateral webs and having at its other end a member adapted to engage the lateral web of one shank member and a laterally extending nose also carried by the last mentioned end of the resilient member and adapted to be engaged by the lateral web of the other shank member.

AUGUST JOOST.